(12) United States Patent
Malinovskiy et al.

(10) Patent No.: US 11,788,933 B2
(45) Date of Patent: Oct. 17, 2023

(54) METHOD FOR MONITORING MEASURED VARIABLES MEASURED ON A PROCESS PLANT WITH MEASURING INSTRUMENTS

(71) Applicant: Endress+Hauser Group Services AG, Reinach (CH)

(72) Inventors: Alexey Malinovskiy, Maulburg (DE); Markus Nick, Kembs (FR); Francois Klein, Hagenthul de Haut (FR)

(73) Assignee: Endress+Hauser Group Services AG, Reinach (CH)

( * ) Notice: Subject to any disclaimer, the term of this patent is extended or adjusted under 35 U.S.C. 154(b) by 0 days.

(21) Appl. No.: 17/529,626

(22) Filed: Nov. 18, 2021

(65) Prior Publication Data
US 2022/0155185 A1 May 19, 2022

(30) Foreign Application Priority Data
Nov. 19, 2020 (DE) ...................... 10 2020 130 618.0

(51) Int. Cl.
*G06F 11/30* (2006.01)
*G01M 99/00* (2011.01)

(52) U.S. Cl.
CPC .................................. *G01M 99/005* (2013.01)

(58) Field of Classification Search
CPC ................................................ G01M 99/005
See application file for complete search history.

(56) References Cited

U.S. PATENT DOCUMENTS

| 2012/0271782 A1* | 10/2012 | Blowers ............... G06N 3/0472 706/12 |
| 2012/0284268 A1 | 11/2012 | Kumar |
| 2017/0033554 A1 | 2/2017 | Vail et al. |

FOREIGN PATENT DOCUMENTS

| EP | 3002651 A1 | 4/2016 | |
| WO | 2008042739 A2 | 4/2008 | |
| WO | WO-2008042739 A2 * | 4/2008 | ........... G05B 23/021 |
| WO | 2017085468 A1 | 5/2017 | |

* cited by examiner

*Primary Examiner* — Phuong Huynh
(74) *Attorney, Agent, or Firm* — Kelly J. Smith; Endress+Hauser (USA) Holding, Inc.

(57) ABSTRACT

A monitoring method includes monitoring variables that change over time and are continuously measured during repeated executions of a dynamic process. The measurement data include training data in a training period and monitoring data measured subsequently to the training period. Vectors are continuously determined based on the measurement data, the vector components of which comprise respective rates of change of the measured values of the individual measured variables determined for a series of successive points in time on the basis of the measurement data, wherein the points in time of each series cover a time window of a duration and the time windows of successive vectors are shifted. The vectors are stored as a reference cluster. The vectors are compared with the reference cluster. An anomaly is determined when a vector is outside the reference cluster.

13 Claims, 2 Drawing Sheets

METHOD FOR MONITORING MEASURED VARIABLES MEASURED ON A PROCESS PLANT WITH MEASURING INSTRUMENTS

CROSS-REFERENCE TO RELATED APPLICATION

The present application is related to and claims the priority benefit of German Patent Application No. 10 2020 130 618.0, filed on Nov. 19, 2020, the entire contents of which are incorporated herein by reference.

TECHNICAL FIELD

The present disclosure relates to a method, for example, a computer-implemented method, for monitoring measured variables that change over time during the processes and that are continuously measured on a process plant during repeated executions of a predetermined dynamic process with a group of measuring instruments used on the plant.

BACKGROUND

Process plants for repeatedly executing predetermined dynamic processes are used in a variety of different industries, such as in the chemical industry, the food industry, and in water and wastewater treatment. They include, but are not limited to, production, processing and treatment plants. Measuring instruments that respectively measure at least one measured variable relevant to the process to be carried out and/or a process product achievable using the process are usually used in such plants. Examples of such measuring instruments include pressure gauges, level meters, density meters, temperature gauges, flow meters, pH meters, etc., as are marketed, for example, by the Endress+Hauser group. In measurement and control technology, as well as in process automation, the measured values of such measuring instruments are used, for example, to monitor, control and/or regulate the process to be repeatedly carried out by the plant.

Anomalies occurring during the ongoing operation of such plants, such as malfunctions and/or damage to the plant, faulty control and/or regulation of the plant, and, of course, also faulty measured values of the measured variables caused by malfunctions of the measuring instruments, can, under certain circumstances, cause significant damage. Such damage ranges from the production of faulty process products to human and environmental hazards emanating from the plant and/or from faulty process products.

In order to ensure the proper functioning of the plant and of the measuring instruments, measuring instruments usually undergo service measures on a regular basis. Such service measures include, for example, verification, calibration and maintenance. Since costs and possibly also an interruption in the ongoing measuring operation are associated with such service measures, the time intervals between successive service measures are measured in such a way that, on the one hand, they are short enough to ensure a sufficient degree of safety and, on the other hand, are long enough to keep costs and effort within a reasonable scope. In order to be able to check the operability of measuring instruments, even during the periods between chronologically successive service measures, it is possible to equip individual measuring instruments with an additional functionality, such as a self-monitoring function or a diagnostic function of which the respective measuring instrument automatically monitors its function. One example of this are the measuring instruments offered by the Endress+Hauser group, which are equipped with a heartbeat function, of which the measuring instrument monitors itself. However, such measuring instruments are frequently more expensive than measuring instruments without such functionality and, for cost reasons therefore, are generally only used in safety-relevant areas.

Alternatively, it is possible to monitor the function of a specific measuring instrument using a model created for this purpose, that the measured variable measured by such specific measuring instrument describes as a function of one or more measured variables which can be measured using other measuring instruments. However, the installation of such models regularly requires detailed knowledge of the process to be executed by the plant, as well as of the dependencies of the individual measured variables on each other, which may result therefrom and which generally have physical causes.

In addition, EP 3 002 651 A1 describes a method for monitoring a process step of a process executable at a plant. The process step is monitored here on the basis of measured values of measured variables measured on the plant during the execution of the process step and the associated measuring times related to a start time of the respective execution of the process step. For this purpose, a model is created on the basis of training data, which model comprises parameters that can be determined on the basis of the measured values and the measuring times.

For a plurality of measuring instruments, the parameters each comprise coefficients of a base function that represents the measured values as a function of time and that is determined based on the measured values of the respective measuring instrument, and a distribution of the deviations between the measured values and a function given by the previously determined coefficients and the basic function. In addition, they comprise degrees of correlation between the measured values of measuring instrument pairs, which supply correlated measured values during the execution of the process step.

In addition, the model comprises, for each parameter, an associated reference range determined on the basis of the training data, in which reference range the respective parameter can be expected when the process step is carried out without error. Accordingly, an anomaly is detected by the monitoring method if at least one of the parameters determined during monitoring is outside the associated reference range.

This method offers the advantage that the model, including the reference ranges, along with the monitoring of the process step can also be carried out on the basis of the measured values already present. However, it is disadvantageous that the method must be carried out separately for each individual process step to be monitored, that the measurement data must be acquired in relation to the start time of the respective process step, and above all that the creation of the model is relatively complex.

SUMMARY

It is an object of the present disclosure to specify an alternative usable method for monitoring measured variables that change over time during the processes and that are continuously measured on a process plant during repeated executions of a predetermined dynamic process with a group of measuring instruments used on the plant, that can be carried out in a simple manner without detailed knowledge of the process.

Such object is achieved by a method, for example, a computer-implemented method, for monitoring measured variables that change over time during the processes and that are continuously measured on a process plant during repeated executions of a predetermined dynamic process with a group of measuring instruments used on the plant. According to the method, and during the repeated executions of the dynamic process, measurement data are continuously acquired, which comprise the measured values of the measured variables measured using the measuring instruments and the associated measuring times at which the measured values were measured.

The measurement data comprise training data measured in a training period and monitoring data measured subsequently to the training period. Vectors are continuously determined on the basis of the measurement data, the vector components of which comprise respective rates of change of the measured values of the individual measured variables determined for a series of k successive points in time on the basis of the measurement data. The points in time of each series cover a time window of predetermined duration and the time windows of successive vectors are shifted relative to one another by a predetermined time difference in each case.

The vectors determined based on the training data are detected and stored in the form of a reference cluster. A monitoring method is carried out in which the vectors determined based on the monitoring data are each compared with the reference cluster, an anomaly is determined. The anomaly is determined if at least one of the vectors determined on the basis of the monitoring data is outside the reference cluster, and information about the detected anomaly is provided.

The method according to the present disclosure offers the advantage that it can be performed in a simpler manner on the basis of the measured values of the measured variables directly, without detailed knowledge of the process. A further advantage is that, via the vectors, the reaction speeds of the measured values of all measured variables in cooperation, which are coupled chronologically via the process, are detected in a period corresponding to the duration of the time windows, and the monitoring can take place over the entire operating period of the plant due to the sliding time window of the successive vectors. A further advantage is that the anomalies are directly discernible on the basis of the reference cluster and the reference cluster can be determined in a very simple manner on the basis of the training data. This offers the advantage that complex models do not have to be determined and dependencies between individual measured variables do not have to be ascertained in order to carry out the method.

An alternative embodiment comprises a measuring instrument according to the present disclosure. The measurement data are acquired in such a way that the measured values of the measured variables and the associated measuring times are transmitted to a data processing device and are stored at least temporarily in a memory associated with the data processing device. The data processing device is designed to execute the determination of the vectors, the determination of the reference cluster and the monitoring method on the basis of the measurement data, and is designed to output the information about the detected anomaly via an interface connected to the data processing device and/or to provide it in a form that can be read out and/or retrieved via the interface.

A first development comprises a method with which the predetermined duration of the time windows is less than or equal to a process duration of the process than or equal to a duration of at least one dynamic process event occurring during each execution of the process, by using at least two of the measured variables change over time, greater than or equal to at least one reaction time respectively associated with one of the measured variables with which the measured values of the respective measured variable change in response to a dynamic process event, and/or greater than or equal to at least one time scale respectively associated with one of the measured variables, on which time scale the measured values of the respective measured variable change over time.

A second development comprises a method with which the predetermined duration of the time windows is determined on the basis of the training data in that on the basis of the rates of change of the measured values of one of the measured variables, a start time is determined at which the rates of change of the measured values of such measured variable exceed a predetermined limit value, on the basis of the measured values of the other measured variables, for each of the other measured variables a respective measured variable-specific end time is determined at which the rates of change of the measured values of the respective other measured variable first exceed a predetermined limit value after the start time. Further, a difference between the measured variable-specific end time and the start time is determined for each measured variable and the duration of the time windows is determined in such a way that it is greater than or equal to at least one of such differences.

A third development comprises a method with which the predetermined duration of the time windows is determined on the basis of the training data in that for at least one of the measured variables in each case time periods in which the measured values of the respective measured variable change over time and a mean value of the rates of change occurring in such time periods is determined based on the rates of change of the measured values of the respective measured variable. A time scale is determined, which corresponds to a period in which the measured values of such measured variable, at a rate of change corresponding to the mean value, changes by a predetermined proportion, by a proportion greater than or equal to 40%, or by a proportion greater than or equal to 60% of a measuring range of the measuring instrument measuring the respective measured variable, and the duration of the time windows is determined in such a way that it is greater than or equal to at least one of such time scales.

A fourth development comprises a method with which the time intervals between the successive points in time within the time windows are each equal to a predetermined constant discretization time. The discretization time is dimensioned such that it is small enough to be able to resolve process dynamics of the process. According to another development, the discretization time is determined on the basis of the training data in that for at least one of the measured variables in each case time periods in which the measured values change over time and a mean value of the rates of change occurring in such time periods is determined based on the rates of change of the measured values of the respective measured variable, and a time scale is determined, which corresponds to a period in which the measured values of such measured variable, at a rate of change corresponding to the mean value, changes by a predetermined percentage, by a percentage smaller than or equal to 10%, or by a percentage smaller than or equal to 5% of a measuring range of the measuring instrument measuring the respective measured variable, and the discretization time is determined in such a way that it is less than or equal to at least one of such time scales.

A fifth development comprises a method with which the time difference by which the time windows of successive vectors are shifted over time relative to one another is greater than the discretization time and/or is less than or equal to the duration of the time windows. A second embodiment comprises a method with which a cause of an anomaly established by the monitoring method is determined and/or is resolved by a corresponding countermeasure.

A sixth development comprises a method with which at least one cause of an anomaly is determined for at least one vector identified using the monitoring method as being outside the reference cluster based on a distance of such vector from the reference cluster in that a proportional contribution of the rates of change of the measured values of the respective measured variable with respect to the distance of the vector from the reference cluster is determined for each measured variable, and the measured values of that/those measured variable(s) whose proportional contribution has the greatest value and/or exceeds a predetermined limit value are determined as the cause of an anomaly, and information about the cause(s) of an anomaly) is provided.

According to a further development of the sixth development, a cause of the anomaly determined using the monitoring method is determined on the basis of at least one of the previously determined causes of an anomaly by checking whether the anomaly detected by the monitoring method was caused by a change over time, which deviates from the expected behavior, of at least one of the measured variables identified via the causes of an anomaly or by a functional impairment of the measuring instrument measuring the respective measured variable, in that a measuring accuracy of the measuring instruments identified via the causes of an anomaly is checked.

According to a third embodiment, the training data are acquired in a training period in which an error-free operation of the plant and of the measuring instruments can be assumed, and in which the process is carried out several times in succession.

BRIEF DESCRIPTION OF THE DRAWINGS

The present disclosure and its advantages will now be explained in detail using the figures in the drawing, which show an exemplary embodiment. The same elements are indicated by the same reference numbers in the figures.

DETAILED DESCRIPTION

The present disclosure relates to a method, in particular, a computer-implemented method, for monitoring measured variables Mj that change over time during the processes and that are continuously measured on a process plant during repeated executions of a predetermined dynamic process with a group of measuring instruments MDj used on the plant.

Plants known from the prior art for repeatedly carrying out a predetermined dynamic process are suitable as a process plant. Examples of this include industrial plants, such as production, processing and treatment plants, such as are already used today in a variety of different industries, such as the chemical industry, food industry, as well as in water and/or wastewater treatment. In particular, a process comprising one or more process steps to be carried out successively over time is suitable as a dynamic process that can be executed repeatedly by the plant. Examples include production, processing and/or treatment processes that can be executed by the plant.

Figure 1:
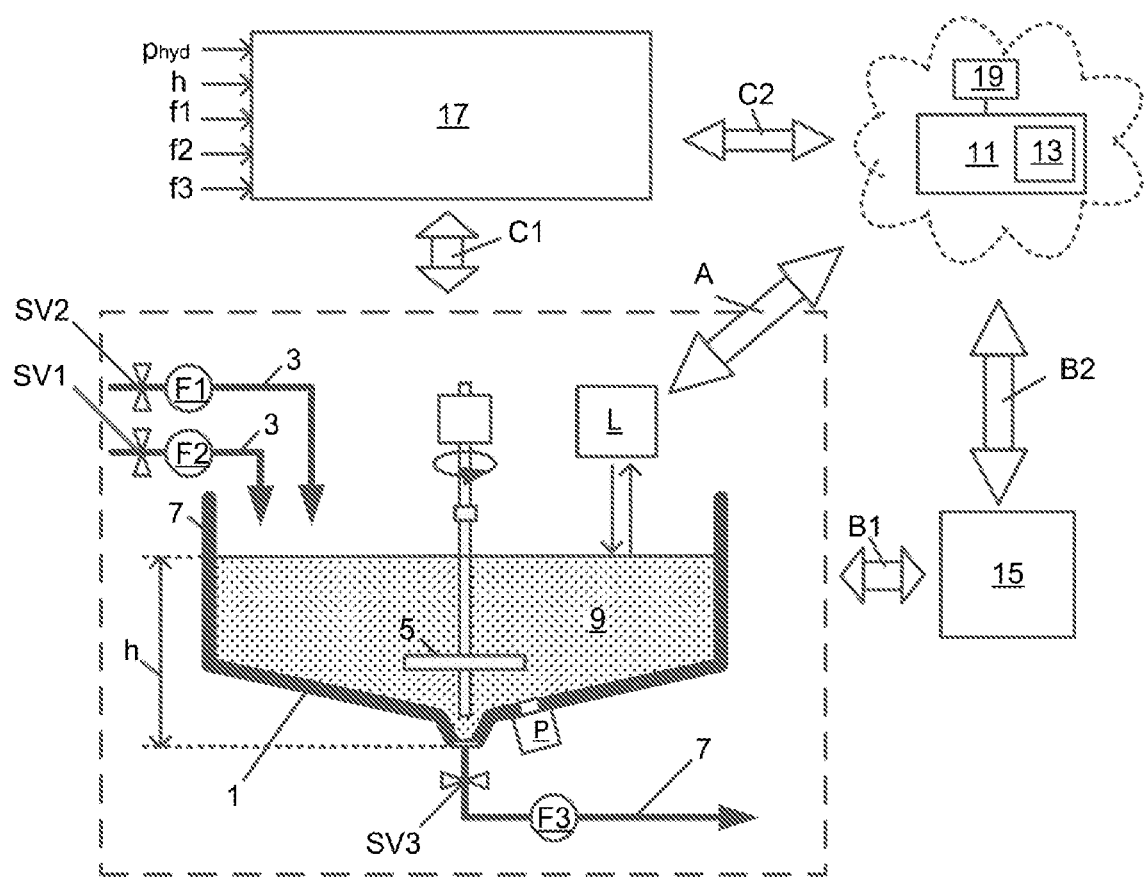
FIG. 1 depicts a plant for repeatedly executing a dynamic process.

FIG. 1 shows, as an example, a process plant for producing a process product. The plant comprises a container 1 that can be filled via feed lines 3 with various inlet media, which are processed in the container 1 using a stirrer 5 to form a process product, which is then removed from the container 1 via an extraction line 7. This process is repeated continuously in the plant, wherein a predetermined quantity of the process product is produced and removed from the container 1 each time the process is carried out.

Measuring instruments known from the prior art for measuring at least one measured variable are suitable as measuring instruments MDj used on the plant. These include, for example, measuring sensors comprising sensors, along with measuring instruments equipped with at least one sensor and/or a measuring sensor, which measuring instruments are designed to metrologically detect at least one measured variable Mj. Examples of this include pressure gauges, level meters, density meters, temperature gauges, flow meters, pH meters, etc., as are marketed, for example, by the Endress+Hauser group. The group of measuring instruments MDj shown in FIG. 1 as a possible example comprise a level meter L for measuring a fill level h of a filling material 9 located in the container 1, at least one flow meter F1, F2, F3 respectively inserted into one of the feed lines 3 or into the extraction line 7 for measuring a flow rate f1, f2, f3 flowing through the respective line, and a pressure gauge P for measuring a hydrostatic pressure phyd exerted by the filling material 9 in the container 1.

Of course, depending on the type of plant and/or the respective process to be carried out repeatedly using the plant, other measuring instruments MDj can also be used.

During operation, the predetermined dynamic process is repeatedly carried out with the plant. At the same time, the measured variables Mj are measured continuously with the measuring instruments MDj. Measurement data D, which comprise measured values mj(ti) of the measured variables Mj, measured using the measuring instruments MDj during the operation of the plant, and the associated measurement times ti, at which the respective measured values mj(ti) were measured, are continuously acquired.

The continuously acquired measurement data D comprise training data DT acquired in a training period at the beginning of the method and monitoring data DU acquired subsequently to the training period. In this case, the training period is in a period in which an error-free operation of the plant and of the measuring instruments MDj can be assumed, and is dimensioned such that the process is carried out several times in succession during the training period.

The measurement data D are acquired, for example, in that the measured values mj(ti) of the measured variables Mj and the associated measured times ti are transmitted to a data processing device 11 and are stored at least temporarily in a memory 13 associated with the data processing device 11.

Depending on the measuring instrument Mj and the design of the plant, the transmission of the measured values mj(ti) of at least one measuring instrument Mj and the associated measuring times ti can occur in each case either via a direct connection A between the respective measuring instrument Mj and the data processing device 11 or via a connection B1, B2; C1, C2 running from the respective measuring instrument Mj via at least one intermediate station to the data processing device 11. A direct connection A is shown in FIG. 1 using the example of the level gauge L. An edge device 15 and/or a higher-level unit 17 arranged on or in the vicinity of the plant is suitable as an intermediate station, for example. A suitable higher-level unit 17 is, for example, a unit, such as a process control system or a programmable logic controller, which monitors, controls and/or regulates the process to be carried out by the plant on the basis of the measured values mj(ti) of the measuring instruments MDj. In the embodiment shown in FIG. 1, the higher-level unit 17 can be designed, for example, in such a way that it controls or regulates the inflow of the inlet media and/or the extraction of the process product as a function of the measured hydrostatic pressure phyd, of the measured fill level h and/or of at least one of the measured flows f1, f2, f3 via a corresponding control of controllable valves SV1, SV2, SV3 inserted into the feed lines 3 and into the extraction line 7.

Wired and/or wireless connections A, B1, B2, C1, C2 and/or communication protocols known from the prior art are suitable, for example, for transmitting the measurement data D. Examples include LAN, WLAN, fieldbus, Profibus, Hart, Bluetooth and Near Field Communication. Optionally, at least one of the measuring instruments Mj, the edge device 15 and/or the higher-level unit 17 is connected to the data processing device 11 via the Internet, e.g., via a communication network, such as TCP/IP.

For example, a single computer, a mainframe computer or another data processing device can be used as the data processing device 11. Alternatively, the data processing device 11 can be a device set up in a cloud. In this case, a procedure known by the term "cloud computing" is used. Cloud computing describes the approach to providing abstracted IT infrastructures, such as hardware, computing capacity, data storage devices, network capacities or even software dynamically adapted to the demand via a network, e.g. a wireless or wired Internet.

Figure 2:
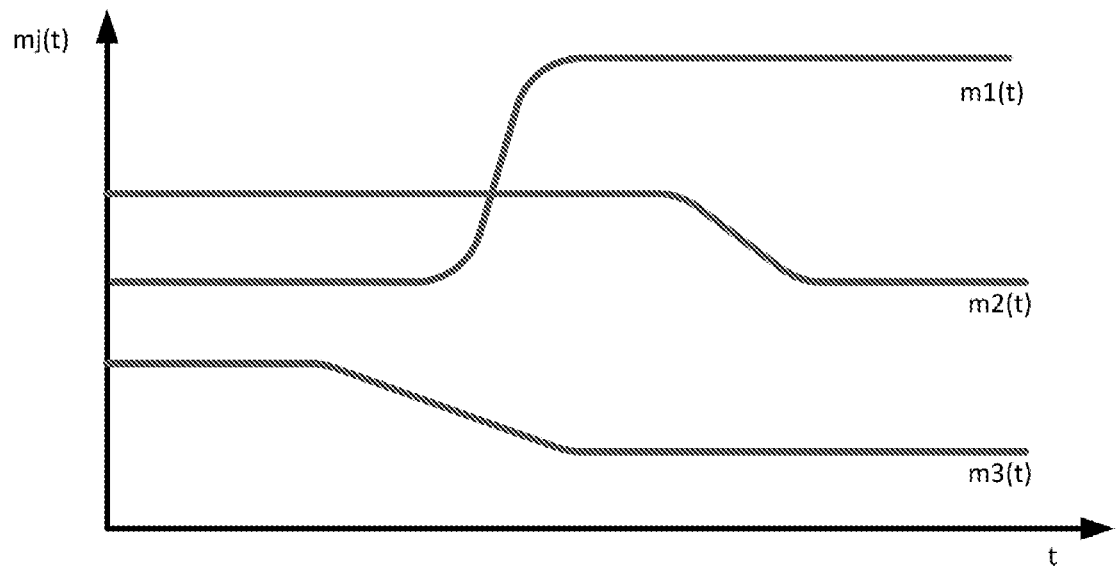
FIG. 2 depicts measured values of three different measured variables.
Figure 3:
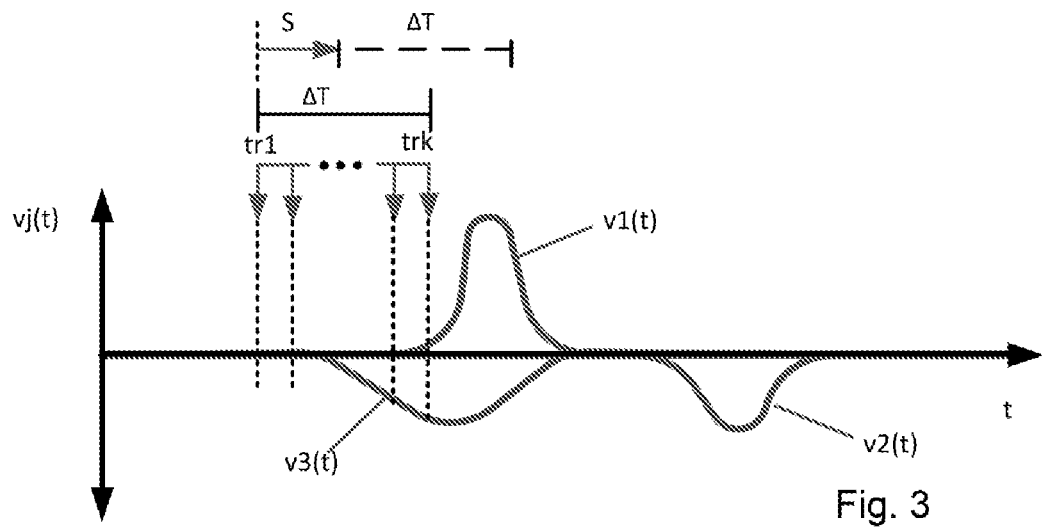
FIG. 3 depicts rates of change of the measured values shown in FIG. 2.

The continuously acquired measurement data D represent a progression over time of the measured values mj(ti) of the measured variables Mj measured with the measuring instruments MDj. Rates of change vj(ti) of the measured values mj(ti) of the individual measured variables Mj are continuously determined on the basis of the measurement data D. FIG. 2 shows as an example a short section of a progression over time of measured values m1(t), m2(t), m3(t) of three different measured variables M1, M2, M3 that change over time. FIG. 3 shows the progression over time of the rates of change v1(t), v2(t), v3(t) of the measured values shown in FIG. 2.

In the case of a deterministic, error-free process that repeatedly runs in the same way and of an error-free measurement of the measured variables Mj, a velocity vector v (t) formed from the rates of change vj(t), where v(t):= (v1 (t), . . . , vn (t)), describes as a function of time t a trajectory in an n-dimensional space, which trajectory is closed to form a ring, wherein the dimension n of the space corresponds to the number of measured variables Mj. Such trajectory is traversed again each time the process is implemented and reproduces the temporal coupling of the rates of change vj(t) of the measured values mj(ti) of the measured variables Mj in cooperation predetermined via the process, the reaction speed of the individual measured variables Mj to the process dynamics and the measuring instrument-dependent reaction speed of the measured values mj(ti) to changes in the measured variable Mj.

On the basis of the rates of change vj(ti), vectors VR are continuously determined, whose vector components each comprise the rates of change vj(ti) of the measured values mj(ti) of the individual measured variables Mj(ti) determined for a series of k successive points in time [tr1, . . . , trk]. Each of such vectors VR consequently comprises the vector components: VR:=(m1(tr1), m1(trk), mn(tr1), . . . , mn(trk))

where n is equal to the number of measured variables Mj and k is equal to the number of successive points in time [tr1, . . . , trk] of the series. Independently of the number of measured variables Mj and the number k of points in time [tr1, . . . , trk], the points in time [tr1, . . . , trk] of each series cover a time window of a predetermined duration $\Delta T$ in each case. Such a time window is shown in FIG. 3 as an example. The time windows are designed as sliding windows. This means that the time windows of successive vectors (VR) are shifted relative to one another in each case by a predetermined time difference indicated in FIG. 3 by a displacement arrow S running parallel to the time axis. Consequently, the time curve of the rates of change vj(ti) of the measured values mj(ti) of the measured variables Mj in cooperation in a segment of the trajectory described by the velocity vector v(t) as a function of time is detected by each of such vectors VR.

In a first step, the vectors VR determined on the basis of the training data TD are detected and stored in the form of a reference cluster RC. A monitoring method is subsequently executed, with which the vectors VR determined continuously on the basis of the monitoring data DU are compared with the reference cluster RC determined previously on the basis of the training data DT. On the basis of this comparison, there is a check of whether at least one of such vectors VR is outside of the reference cluster RC. If this is the case, an anomaly is detected and information about the detected anomaly is provided.

Figure 4:
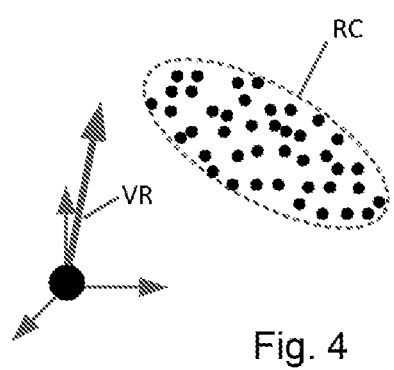
FIG. 4 depicts a reference cluster and a vector located outside the reference cluster.

For this purpose, FIG. 4 shows a schematic diagram in which the vectors VR determined on the basis of the training data DT and forming the reference cluster RC are represented as points, and in which a vector VR determined on the basis of the monitoring data DU and lying outside of the reference cluster RC is represented as an arrow originating from the coordinate origin of the n*k dimensional space.

The determination of the vectors VR, the determination of the reference cluster RC, and the monitoring executed following the determination of the reference cluster RC on the basis of the vectors VR are preferably executed using the data processing device 11. In this case, the data processing device 11 is preferably designed to output the information about the detected anomalies via an interface 19 connected to the data processing device 11 and/or to make it available for further use in a form readable and/or retrievable via the interface 19. If the information is output, this can take place, for example, in the form of an alarm, an output signal or in the form of an email or a text message to a predefined recipient, such as a predefined email address, a smartphone or a tablet.

The monitoring method is based on the fact that the measured values mj(ti) of all measured variables Mj are chronologically coupled via the process execution. During the error-free operation of the plant, this results in each dynamic process event causing the measured variables Mj affected by the process event to change over time with a reaction time dependent on the process and a reaction amplitude dependent on the process. In the case of the error-free operation of the measuring instruments MDj, the measured values mj(ti) of the measured variables Mj also change accordingly in each case with a reaction time and reaction amplitude dependent on the reaction time and the reaction amplitude of the measured variable Mj and on the measurement properties of the measuring instrument Mj. Accordingly, anomalies are detected via the comparison with the reference clusters RC, which lead to the measured values mj(ti) of at least one of the measured variables Mj changing over time in relation to the measured values mj(ti) of the other measured variables Mj with a reaction time and/or reaction amplitude deviating from the reference cluster RC. This offers the advantage that, with only one uniform monitoring method carried out on the basis of the reference cluster RC, both process or plant-related anomalies are identified, which lead to at least one of the measured variables Mj monitored on the basis of the measured values mj(ti) changing over time in relation to the measured values mj(ti) of the other measured variables Mj in a manner deviating from the reference cluster RC, and anomalies are identified, with which measured values mj(ti) of at least one of the measuring instruments MDj change over time in a manner deviating from the reference cluster RC due to a functional impairment of the respective measuring instrument MDj in relation to the measured values mj(ti) of the other measuring instruments MDj. An example of a process-related anomaly is an erroneous process execution caused, for example, by an erroneous control or regulation of the process. An example of an anomaly caused by plants is a hole in the container 1, which leads to a time-delayed increase in the fill level h and/or a smaller increase in terms of the amount. Examples of functional impairments of the measuring instruments MDj that can be identified as an anomaly using the method are functional impairments, such as a range error, which have an effect on the amplitude of the rates of change vj(ti) of the measured values mj(ti), along with functional impairments that have an effect on the reaction time of the measured values mj(ti) of the measuring instrument MDj on changes to the measured variable.

The method has the advantages mentioned at the outset. Optionally, individual method steps can have different embodiments that can be used individually or in combination with one another. Examples of this are described below.

For example, the duration ΔT of the time windows can be determined in different ways. One option is to determine the duration ΔT of the time windows on the basis of a process duration of the process repeatedly executed on the plant in such a way that the duration ΔT is less than or equal to the process duration of the executed process. For a very short process duration, such as, for example, a process duration of one or a few minutes, the duration ΔT of the time windows can, for example, be essentially equal to the process duration. With a longer process duration, the duration ΔT of the time windows can be determined, for example, in such a way that it corresponds to a predetermined percentage of the process duration, such as a proportion of 5% to 10% of the process duration.

Alternatively or additionally thereto, the duration ΔT of the time windows is dimensioned, for example, in such a way that it is greater than or equal to the duration of at least one dynamic process event occurring during each execution of the process, wherein at least two of the measured variables Mj change over time. Examples of dynamic process events are the filling processes and emptying processes carried out using the plant shown in FIG. 1, with which in each case the flow rate f1, f2, f3 through the associated feed line 3 or the extraction line 7, the fill level h in the container 1 and the hydrostatic pressure phyd in the container 1 change.

Alternatively or additionally thereto, the duration ΔT of the time windows can be predetermined in such a way that it is greater than or equal to at least one reaction time respectively associated with the measured variables Mj, with which the measured value mj(ti) of the respective measured variable Mj changes in response to a dynamic process event. Such reaction times can be estimated, for example, on the basis of the training data DT. This can be done, for example, in such a way that a start time ta is determined on the basis of the rates of change vj(ti) of the measured values mj(ti) of one of the measured variables Mj, at which the rates of change vj(ti) of the measured values mj(ti) of such measured variable Mj exceed a predetermined limit value and a measured variable-specific end point tej is determined on the basis of the measured values mj(ti) of the other measured variables Mj, at which the rates of change vj(ti) of the measured values mj(ti) of the respective other measured variable Mj for the first time exceed a predetermined limit value after the start time ta. The difference Δtj:=tej−ta between the measured variable-specific end time tej and the start time ta is then determined for each measured variable Mj. In this case, each of the differences Δtj respectively forms an estimated value for a reaction time on the basis of which the duration ΔT of the time windows is determined in such a way that it is greater than or equal to at least one of such estimated values.

Alternatively or additionally thereto, the duration ΔT of the time windows can be predetermined in such a way that it is greater than or equal to at least one respective time scale determined for one of the measured variables Mj, on which time scale the measured values mj(ti) of the respective measured variable Mj change over time. This time scale can be determined for each measured variable Mj on the basis of the training data TD. In this case, for example, on the basis of the rates of change vj(ti) of the measured values mj(ti) of the respective measured variable Mj, time periods are established, in which the measured values mj(ti) change over time and a mean value of the rates of change vj(ti) occurring in such time periods is determined. The time scale is determined using this mean value. Optionally, this can be done, for example, in such a way that the time scale is set equal to a time interval in which the measured values mj(ti) change at a rate of change vj(ti) corresponding to the mean value by a predetermined proportion, such as a proportion greater than or equal to 40% or greater than or equal to 60%, of the measuring range of the respective measuring instrument MDj.

Irrespective of whether the duration ΔT of the time windows can be determined based on the process duration, the duration of at least one dynamic process event occurring during each execution of the process, at least one reaction time respectively associated with the measured variables Mj, and/or on the basis of at least one time scale respectively associated with one of the measured variables Mj, the time intervals between the successive points in time tr1, ..., trk within the time windows can also be determined or predetermined in different ways. Optionally, for example, a constant discretization time can be set. In this case, the time intervals between the directly successive points in time tr1, ..., trk are each equal to the predetermined constant discretization time.

The discretization time is preferably measured such that it is small enough to still be able to resolve the process dynamics of the process. For this purpose, the discretization time can be set, for example, to be equal to an estimated value determined on the basis of the process. Alternatively or additionally thereto, the discretization time can be determined on the basis of at least one of the time scales that can be established in the previously described manner on the basis of the training data DT. In this case, the discretization time is determined, for example, such that it is less than or equal to the period in which the measured value mj(ti) of the respective measured variable Mj, at a rate of change vj(ti) corresponding to the mean value, changes by a predetermined percentage of the measured value range, such as, for example, a percentage of less than or equal to 10% or less than or equal to 5% of the measuring range of the respective measuring instrument MDj. This percentage is, of course, to be set significantly lower than the proportion of the measurement region used for determining the duration ΔT of the time window.

The time difference represented in FIG. 3 by the displacement arrow S by which the time windows of successive vectors VR are shifted over time relative to one another, is dimensioned, for example, such that it is greater than the discretization time and/or less than or equal to the duration ΔT of the time windows.

If an anomaly is determined by the monitoring method, its cause is preferably determined and resolved by a corresponding countermeasure. With regard to the determination of the cause, it is optionally proceeded such that, for example, at least one cause of an anomaly is determined for at least one vector VR identified on the basis of the monitoring method as vector VR located outside the reference cluster RC on the basis of a distance of the respective vector VR from the reference cluster RC. For this purpose, for each measured variable Mj, a proportional contribution of the rates of change vj(ti) of the measured values mj(ti) of the respective measured variable Mj with respect to the distance of such vector VR from the reference cluster RC is determined. The measured values Mj(ti) of at least one of the measured variables Mj are then each identified as a cause of an anomaly. In this respect, the measured values mj(ti) of the measured variable Mj, whose proportional contribution has the largest value, are determined as the cause of an anomaly. Alternatively or additionally here, the measured values mj(ti) of those measured variables Mj whose proportional contribution exceeds a predetermined limit value are determined as the cause of an anomaly.

The determination of the causes of an anomaly is also executed, for example, using the data processing device 11 and information about the determined causes of an anomaly is made available. The latter is output, for example, via the interface 19 connected to the data processing device 11 and/or made available by the data processing device 11 in a form readable and/or retrievable via the interface 19.

The causes of an anomaly make it easier for the operator of the plant to determine the cause underlying the anomaly and to take corresponding countermeasures. For this purpose, there is optionally a check, for example, of whether the anomaly detected by the monitoring method was caused by a change over time, which deviates from the expected behavior, of at least one of the measured variables Mj or by a functional impairment of the measuring instrument MDj measuring the respective measured variable Mj. For this purpose, it is, for example, a method in such a way that the measuring accuracy of the measuring instruments MDj identified via the causes of an anomaly is first checked. This can be done, for example, on the basis of reference measurements executed during ongoing operation of the plant or within the framework of a calibration method. If a functional impairment of one of the measuring instruments MDj is detected in this case, the respective measuring instrument MDj is recalibrated or exchanged. If there is no functional impairment of the measuring instruments MDj, the cause is preferably determined by first examining areas of the plant and of the plant control and/or regulation, which have an influence on the measured variables Mj identified via the causes of an anomaly.

The invention claimed is:

1. A method for monitoring measured variables that change over time during a process and that are continuously measured in a process plant during repeated executions of a predetermined dynamic process with a group of measuring instruments used in the plant, including:
   during the repeated executions of the dynamic process, continuously acquiring measurement data which comprise the measured values of the measured variables measured using the measuring instruments and the associated measuring times at which the measured values were measured,
   wherein the measurement data comprise training data measured in a training period and monitoring data measured subsequently to the training period,
   the method including continuously determining vectors on the basis of the measurement data, vector components of which comprise respective rates of change of the measured values of the individual measured variables determined for a series of successive points in time on the basis of the measurement data, wherein the points in time of each series cover a time window of predetermined duration and the time windows of successive vectors are shifted relative to one another by a predetermined time difference in each case,
   wherein the vectors determined based on the training data are detected and stored in the form of a reference cluster, and
   the method further including:
   comparing the vectors determined on the basis of the monitoring data with the reference cluster,
   identifying an anomaly if at least one of the vectors determined on the basis of the monitoring data is outside the reference cluster, and
   providing information about the detected anomaly.

2. The method according to claim 1,
   acquiring the measurement data in such a way that the measured values of the measured variables and the associated measuring times are transmitted to a data processing device and are stored at least temporarily in a memory associated with the data processing device, and
   executing the determination of the vectors using the data processing device, the determination of the reference cluster and the monitoring method on the basis of the measurement data, and is designed to output the information about the detected anomaly via an interface connected to the data processing device and/or to provide it in a form that can be read out and/or retrieved via the interface.

3. The method according to claim 1, wherein the predetermined duration of the time windows is:
   less than or equal to a process duration of the process,
   greater than or equal to a duration of at least one dynamic process event occurring during each execution of the process, by which at least two of the measured variables change over time, greater than or equal to at least one reaction time respectively associated with one of the measured variables with which the measured values of the respective measured variable change in response to a dynamic process event, and/or greater than or equal to at least one time scale respectively associated with one of the measured variables, on which time scale the measured values of the respective measured variable change over time.

4. The method according to claim 1, wherein the predetermined duration of the time windows is determined on the basis of the training data in that:

on the basis of the rates of change of the measured values of one of the measured variables, a start time is determined, at which the rates of change of the measured values of such measured variable exceed a predetermined limit value, on the basis of the measured values of the other measured variables, for each of the other measured variables a respective measured variable-specific end time is determined at which the rates of change of the measured value of the respective other measured variable first exceed a predetermined limit value after the start time, a difference between the measured variable-specific end point and the start time is respectively determined for each measured variable, the duration of the time windows is determined in such a way that it is greater than or equal to at least one of these differences.

5. The method according to claim 1, wherein the predetermined duration of the time windows is determined based on the training data wherein:

for at least one of the measured variables, in each case, time periods in which the measured values of the respective measured variable change over time and a mean value of the rates of change occurring in such time periods is determined based on the rates of change of the measured values of the respective measured variable, and a time scale is determined, which corresponds to a period in which the measured values of such measured variable, at a rate of change corresponding to the mean value, changes by a predetermined proportion, by a proportion greater than or equal to 40%, or by a proportion greater than or equal to 60% of a measuring range of the measuring instrument measuring the respective measured variable, and the duration of the time windows is determined in such a way that it is greater than or equal to at least one of such time scales.

6. The method according to claim 1, wherein the time intervals between the successive points in time within the time windows are each equal to a predetermined constant discretization time.

7. The method according to claim 6, wherein the discretization time is dimensioned such that it is small enough to be able to resolve process dynamics of the process.

8. The method according to claim 6, wherein the discretization time is determined based on the training data, wherein:

for at least one of the measured variables, in each case, time periods in which the measured values change over time and a mean value of the rates of change occurring in such time periods is determined on the basis of the rates of change of the measured values of the respective measured variable, and a time scale is determined, which corresponds to a period in which the measured values of such measured variable, at a rate of change corresponding to the mean value, changes by predetermined percentage, by a percentage of less than or equal to 10% or by a percentage of less than or equal to 5% of a measuring range of the measuring instrument measuring the respective measured variable, and the discretization time is determined in such a way that it is less than or equal to at least one of such time scales.

9. The method according to claim 1, wherein the time difference by which the time windows of successive vectors are shifted over time relative to one another is greater than the discretization time and/or is less than or equal to the duration of the time windows.

10. The method according to claim 1, wherein a cause of an anomaly established by the monitoring method is determined and/or resolved by a corresponding countermeasure.

11. The method according to claim 1, wherein, at least one cause of an anomaly is determined for at least one vector identified using the monitoring method as being outside the reference cluster based on the distance of such vector from the reference cluster, in that:

a proportional contribution of the rates of change of the measured values of the respective measured variable with respect to the distance of the vector from the reference cluster is determined for each measured variable, and the measured values of that/those measured variable(s), whose proportional contribution has the largest value and/or exceeds a predetermined limit value are determined as the cause of an anomaly, and information about the causes of an anomaly is provided.

12. The method according to claim 11, wherein a cause of the anomaly determined using the monitoring method is determined on the basis of at least one of the previously determined causes of an anomaly is determined by checking whether the anomaly detected by the monitoring method was caused by a change over time, which deviates from the expected behavior, of at least one of the measured variables identified via the causes of an anomaly or by a functional impairment of the measuring instrument measuring the respective measured variable, in that a measuring accuracy of the measuring instruments identified by the causes of an anomaly is checked.

13. The method according to claim 1, the method including detecting training data in a training period in which an error-free operation of the plant and of the measuring instruments can be assumed, and in which the process is carried out several times in succession.

* * * * *